United States Patent [19]

Schönsteiner

[11] Patent Number: 5,794,480

[45] Date of Patent: Aug. 18, 1998

[54] DEVICE FOR DRIVING OF SLIDING ROOFS, WINDOW RAISERS, OR THE LIKE

[75] Inventor: Jochen Schönsteiner, München, Germany

[73] Assignee: Webasto Karosseriesysteme GmbH, Stockdorf, Germany

[21] Appl. No.: 612,178

[22] Filed: Mar. 7, 1996

[30] Foreign Application Priority Data

Mar. 10, 1995 [DE] Germany .................. 195 08 556.6

[51] Int. Cl.[6] ........................................... F16H 57/12
[52] U.S. Cl. ........................... 74/425; 74/427; 74/409
[58] Field of Search ............................ 74/425, 426, 427, 74/409, 396

[56] References Cited

U.S. PATENT DOCUMENTS

| 292,927 | 2/1884 | Lipe | 74/396 |
|---|---|---|---|
| 4,790,202 | 12/1988 | Hayashi | 74/396 |
| 4,852,419 | 8/1989 | Kittel | 74/425 |
| 5,212,999 | 5/1993 | Kitada | 74/425 |
| 5,566,592 | 10/1996 | Adam | 74/425 |

FOREIGN PATENT DOCUMENTS 2905869  8/1980  Germany .

*Primary Examiner*—Charles A. Marmor
*Assistant Examiner*—David M. Fenstermacher
*Attorney, Agent, or Firm*—Sixbey, Friedman Leedom & Ferguson; David S. Safran

[57] ABSTRACT

A device for driving of sliding roofs, window raisers, or the like, especially of motor vehicles, with a reversible drive motor (1) and a worm gear pair on an output side of the drive motor, with a shaft of a worm gear (2) forming an extension of the motor shaft. The axial play of the worm gear shaft (2) is adjustable by an adjustment part (4) which rests against a distal end of the worm gear shaft (2) and which is movably guided in an axial direction of the worm gear shaft (2). The adjustment part (4) can be pressed against a stationary guide surface (17) by a positioning screw (12) which is screwed into an opening of this guide surface (17) or by a fastening rivet (22) which penetrates a hole (23) in the guide surface. The longitudinal axis of the screw (12) or rivet (22) is at least approximately perpendicular to the worm gear shaft axis (9).

10 Claims, 1 Drawing Sheet

DEVICE FOR DRIVING OF SLIDING ROOFS, WINDOW RAISERS, OR THE LIKE

BACKGROUND OF THE INVENTION

1. Field of the Invention

The invention relates to a device for driving of sliding roofs, window raisers, or the like, especially of motor vehicles, with a reversible drive motor which has a worm gear pair on its output side, a worm gear shaft being formed as an extension of the motor shaft. More specifically, the invention is directed to such a device with a means for adjusting the axial play of the worm gear shaft, this means having an adjustment part which rests against a free end of the worm gear shaft and which is movably guided in the axial direction of the worm gear shaft.

2. Description of Related Art

To adjust the axial play of the worm gear shaft of a drive device of the initially mentioned type, various designs have been suggested which, however, are mostly complex in structure or problematic in handling.

Thus, for example, in published German Patent Application 29 05 869, a drive assembly for driving the windshield wipers on motor vehicles with an electric motor and a downstream worm gear pair is described in which there is a set screw which interacts with one end of the worm gear shaft. This set screw is located coaxially with respect to the worm gear shaft in order to control its axial-play.

If the drive assembly described in German Patent Application 29 05 869 is to be used as a drive for a window raiser or a sliding roof in a motor vehicle, this drive should be installed in the door panel or side covering, or in the vehicle roof, such that the axis of the worm gear shaft is in a plane that is parallel to the vehicle door or side wall, or vehicle roof. Since the axial play of the worm gear shaft can be suitably adjusted only in the installed state of the drive and the axis of the set screw, however, runs in a direction coaxially to the worm gear axis, problems arise with respect to the accessibility of the set screw when the installation space for the drive, especially if it is a drive for a sliding roof, is tailored to the special drive, and thus, the drive is accessible from the side only with difficulty, if at all. Moreover, to adjust the axial play, the motor must run since otherwise it cannot be recognized whether the set screw has been turned in far enough.

SUMMARY OF THE INVENTION

Accordingly, a primary object of this invention is to devise a device for driving of sliding roofs, window raisers, or the like, in which the adjustment of axial play takes place from a direction which is perpendicular to the installation plane of the device.

This object is achieved in this invention by the fact that the adjustment part can be pressed against the adjustment part guide surface by means of a positioning screw which is screwed into an opening of this guide surface and which has an axis which is at least approximately perpendicular to the worm gear shaft axis.

In particular, the adjustment part can be provided with a longitudinal slot or longitudinal groove which extends in the direction of the worm gear shaft axis, through which the shaft of the positioning screw extends.

The adjustment part can be formed of a material, preferably plastic, which is soft as compared to the material of the positioning screw, so that the head of the positioning screw is buried therein when the adjustment part is pressed against the guide surface. In this way slippage of the adjustment part is prevented, after adjustment of the axial play of the worm gear shaft is completed, by a combined form and force fit.

To prevent lateral yielding of the worm gear shaft in a direction away from the worm gear shaft axis, the adjustment part can have a receiver for the free end of the worm gear shaft.

In another embodiment of the invention, the adjustment part can be guided in a guide rail which is open in the direction to the head of the positioning screw and which is U-shaped in cross section; the bottom of the guide rail forms the guide surface. In particular this guide rail can form part of the housing of the gear.

These and further objects, features and advantages of the present invention will become apparent from the following description when taken in connection with the accompanying drawings which, by way of example only, show several embodiments in accordance with the present invention.

DETAILED DESCRIPTION OF THE PREFERRED EMBODIMENTS

Figure 1:
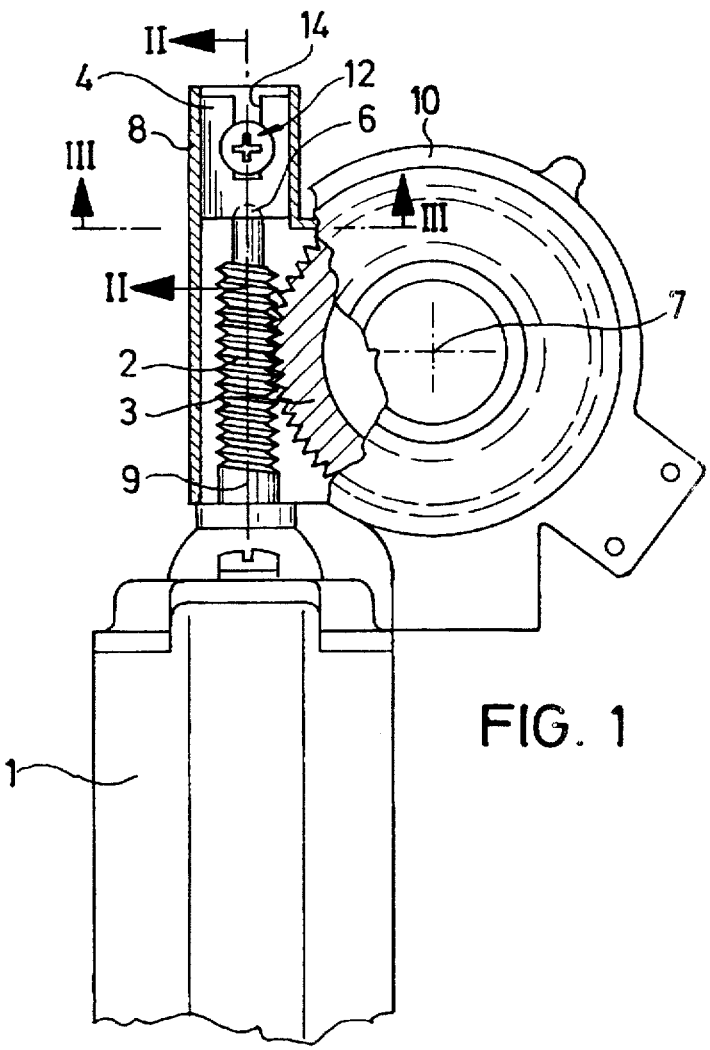
FIG. 1 is a partially broken away plan view of a device for driving of sliding roofs, window raisers or the like in accordance with the invention.

The device shown in FIG. 1 for driving of sliding roofs, window raisers, or the like has an electric drive motor 1 with a driven shaft which is formed as a worm gear shaft 2. It goes without saying that the driven shaft of drive motor 1 and worm gear shaft 2 can also be two separate parts which are joined to one another, for example, by means of a flange. Worm gear shaft 2 drives a worm wheel 3 which is coupled to additional working means, e.g., a gear transmission assembly, drive pinion, or the like, in a manner which is not shown, especially to a pinion for driving of the drive cable of a sliding roof, sliding and raising roof, window raiser, or the like.

To adjust the axial play of worm gear shaft 2, an adjustment part 4 is provided which is preferably formed of a relatively soft material, especially plastic. Adjustment part 4 has a receiver 5 in the form of a concave, for example, more or less hemispherical depression into which a distal end 6 of the worm gear shaft 2 is inserted, in order to prevent, in this way, lateral deflection of the worm gear shaft 2 in a direction away from axis 7 of worm wheel 3 when it is loaded. The adjustment part is movably guided in a guide rail 8, which is U-shaped in cross section, in the direction of axis 9 of worm gear shaft 2. Guide rail 8, preferably, is made as one part of a two-part gear housing 10 which accommodates, among others, worm gear shaft 2 and worm wheel 3.

Adjustment part 4 interacts with a positioning screw 12 which has a longitudinal axis 13 which is at least roughly perpendicular to worm gear shaft axis 9. The shaft 18 of the positioning screw 12, in the illustrated embodiment, extends through a longitudinal slot 14 of adjustment part 4, the slot extending in the direction of worm gear shaft axis 9. This slot is open at its end which is opposite worm gear shaft 2. The positioning screw 12 is screwed into a hole 16 in guide surface 17 of guide rail 8. Hole 16 can be made as a threaded hole. Preferably, however, the positioning screw 12 is a self-tapping screw, so that hole 16 does not require a prefabricated thread. In guide rail 8, a guide surface 17 is formed by the bottom surface of the rail.

When positioning screw 12 is tightened, its head 15 rests against the end of the adjustment part 4 which is opposite that which rests on guide surface 17 and presses adjustment part 4 against guide surface 17. In doing so, the head 15 becomes buried in the material of the relatively soft adjustment part 4, and by which adjustment part 4 is retained in the position which provides for the desired axial play of the worm gear shaft 2, without additional aids, by means of a combined force and form fit. The axial play is made to be especially easily adjusted using this disclosed device. When positioning screw 12 is loosened only adjustment part 4 need be placed accordingly against free end 6 of work gear shaft 2, worm gear shaft end 6 extending into receiver 5. Then, the positioning screw 12 is tightened. All these steps can be executed at an easily accessible site in the z-direction (direction parallel to axis 13).

Figure 4:
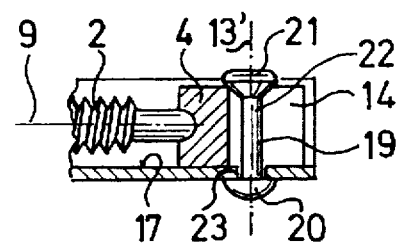
FIG. 4 shows is a view similar to that of FIG. 2, but with an adjustment part which is attached by a fastening rivet instead of a screw.

According to one modified embodiment which is shown in FIG. 4, the guide surface 17 has a through hole 23 instead of threaded hole 16, and the shaft 22 of a fastening rivet 19 passes through hole 23. The head 21 of fastening rivet 19 becomes buried in the relatively soft material of the adjustment part 4 during riveting (tightening and forming of closing head 20), so that the set axial play is also secured here by a combined form and force fit.

Instead of threaded hole 16, in the first embodiment, a through hole can also be provided through which the shaft 18 of screw 12 freely passes and which is tightened in place on the outside of guide surface 17 by means of a nut.

Figure 2:
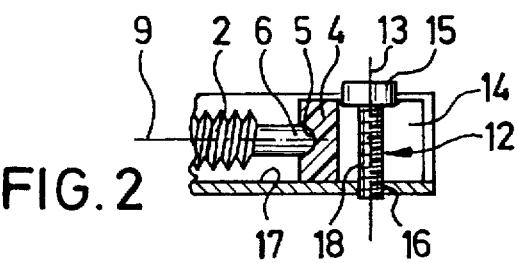
FIG. 2 shows a longitudinal section through an adjustment part and the free end of a worm gear shaft taken along line II—II of FIG. 1.
Figure 3:
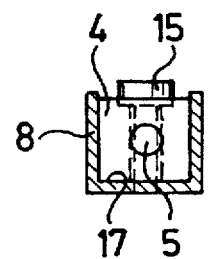
FIG. 3 shows a transverse cross section taken along line III—III of FIG. 1.

Within the framework of the invention, the illustrated embodiments can be modified in various other ways. For example, the soft adjustment part shown in FIG. 2 can also be made of a rigid material, especially metal (as represented in FIG. 4). In this case, it is a good idea to provide for additional retention of the positioning screw, for example, by a lock washer which is inserted under its head. In place of the open-ended longitudinal slot 14 in adjustment part 4, a slot in the shape of a longitudinal hole can be provided. Thus, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Device for driving of a movable part of a motor vehicle, comprising a reversible drive motor to which a worm gear pair is connected on an output side of the motor, a worm gear shaft of which is formed as an extension of the motor shaft, and means for adjusting axial play of the worm gear shaft, said means having an adjustment part which rests against a free end of the worm gear shaft and which is movably guided in an axial direction of the worm gear shaft; wherein the adjustment part is engageable against a stationary guide surface by one of a positioning screw and a fastening rivet which extends through a hole in the stationary guide surface with a longitudinal axis thereof being at least approximately perpendicular to a longitudinal axis of the worm gear shaft, said one of a positioning screw and a fastening rivet tightly securing said adjustment part by acting thereon in the axial direction of the worm gear shaft.

2. Device according to claim 1, wherein the adjustment part is provided with a longitudinal opening which extends in the axial direction of worm gear shaft and through which a shaft of said one of the positioning screw and fastening rivet passes.

3. Device according to claim 2, wherein the adjustment part is formed of a material which is soft as compared to a material of which said one of the positioning screw and fastening rivet is formed for enabling a head of said one of the positioning screw and fastening rivet to be buried therein when the adjustment part is pressed against the stationary guide surface by said one of the positioning screw and fastening rivet.

4. Device according to claim 3, wherein the adjustment part is formed of plastic.

5. Device according to claim 1, wherein the adjustment part is formed of a material which is soft as compared to a material of which said one of the positioning screw and fastening rivet is formed for enabling a head of said one of the positioning screw and fastening rivet to be buried therein when the adjustment part is pressed against the stationary guide surface by said one of the positioning screw and fastening rivet.

6. Device according to claim 5, wherein the adjustment part is formed of plastic.

7. Device according to claim 5, wherein the adjustment part has receiver for a distal end of the worm gear shaft which prevents lateral yielding of the worm gear shaft in the direction away from an axis of rotation of a worm wheel of the worm gear pair.

8. Device according to claim 5, wherein the adjustment part is guided in a guide rail which is open in a direction toward a head of said one of the positioning screw and fastening rivet, and which has a U-shaped cross section, a bottom of the guide rail forming the stationary guide surface.

9. Device according to claim 8, wherein the guide rail forms one part of a two-part housing for the worm gear pair.

10. Device according to claim 1, wherein the adjustment part has receiver for a distal end of the worm gear shaft which prevents lateral yielding of the worm gear shaft in the direction away from an axis of rotation of a worm wheel of the worm gear pair.

* * * * *